April 1, 1930.　　　G. BACKER　　　1,753,189
CYLINDER POTATO DIGGER
Filed Nov. 23, 1927　　2 Sheets-Sheet 1
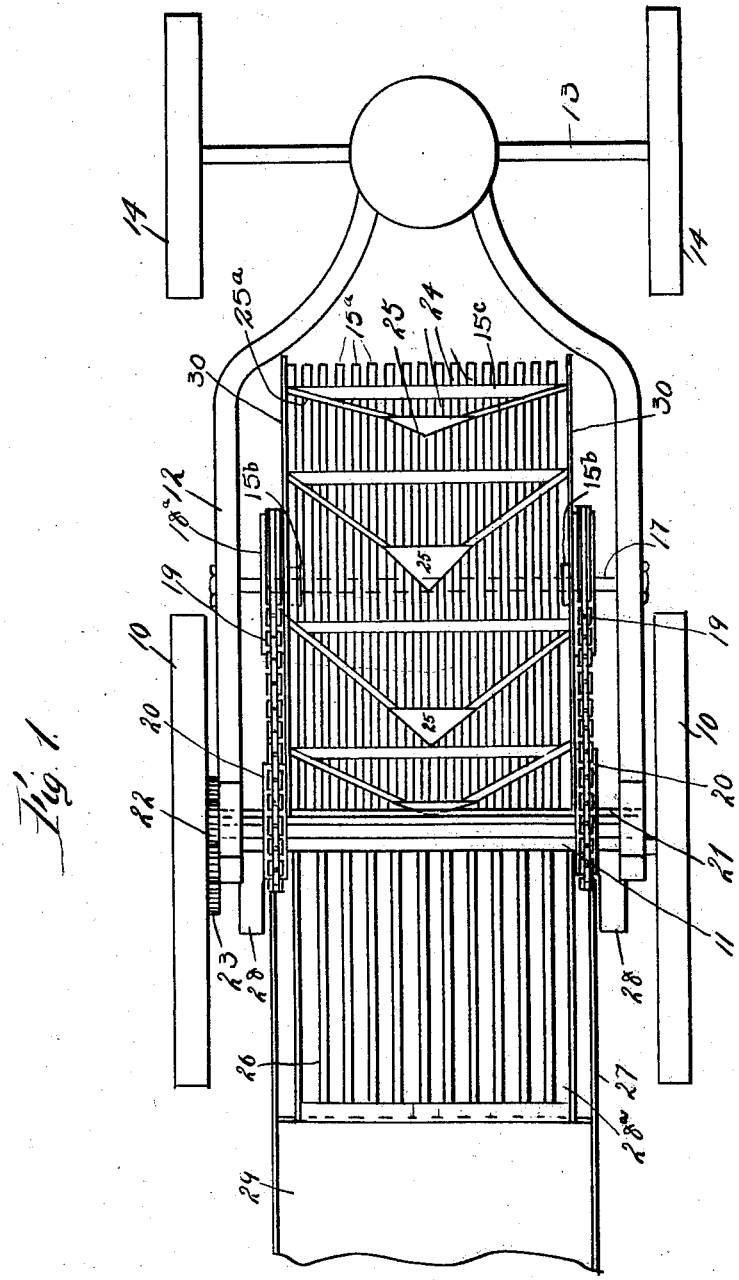
Inventor
George Backer
By W. W. Williamson
Atty.

April 1, 1930.  G. BACKER  1,753,189
CYLINDER POTATO DIGGER
Filed Nov. 23, 1927  2 Sheets-Sheet 2
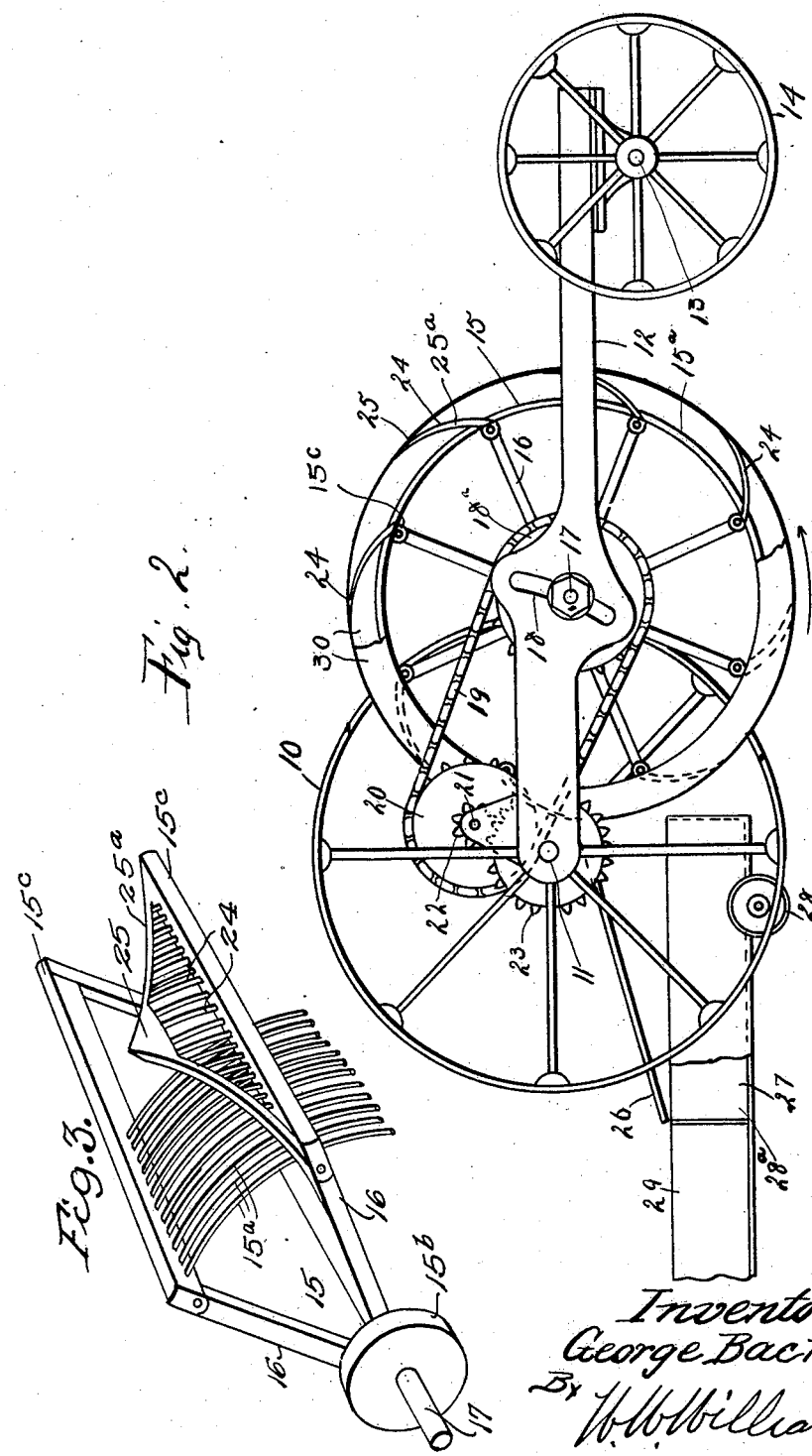

Patented Apr. 1, 1930

1,753,189

UNITED STATES PATENT OFFICE

GEORGE BACKER, OF SHAMOKIN DAM, PENNSYLVANIA

CYLINDER POTATO DIGGER

Application filed November 23, 1927. Serial No. 235,191.

My invention relates to new and useful improvements in cylinder potato diggers, and has for its primary object to provide an exceedingly simple and effective device of this description which will scoop up the potatoes from the ground and dump the same upon a screen where they will be sized but finally delivered to a small truck attached to the digger.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1, is a plan view of a digging machine made in accordance with my improvement.

Fig. 2, is a side elevation of Fig. 1.

Fig. 3 is a fragmentary perspective view of the cylinder or drum to more clearly illustrate the construction or arrangement of said cylinder or drum and the scoops, one of which is shown.

In carrying out my invention as herein embodied, 10 represents the traction wheels which may be of any suitable design mounted upon a stationary axle 11 so as to revolve thereon, said axle being properly secured in the frame of the machine 12, the front end of said frame being supported upon the front axle 13 in any suitable manner, and this front axle has mounted thereon, the front wheels 14.

15 represents a cylinder or drum, including hubs 15$^b$, Figs. 1 and 3, from which radiate spokes 16 carrying cross bars 15$^c$ at their outer ends on which are mounted a plurality of circular spaced strips or ribs 15$^a$ for a purpose to be later described and at both ends of the cylinder are flanges 30 to guide potatoes and dirt scooped up, as will be more readily understood from the succeeding description.

This cylinder 15 is mounted by means of the hubs 15$^b$ upon the shaft 17, the ends of which pass through the slots 18 formed in the side bars of the frame so that the cylinder may be set up or down relative to the ground over which the machine is to pass, thereby providing for deep or shallow digging.

The cylinder 15 is provided with the sprocket wheels 18$^a$ over which run the sprocket belts 19, the latter also running over the sprocket wheels 20. These sprocket wheels 20 are mounted upon the counter shaft 21 which also carries a pinion 22, the latter meshing with the gear wheel 23 secured upon one of the traction wheels 10. By this arrangement, when the machine is drawn forward the cylinder 15 will be rotated in the direction of the arrow marked adjacent thereto by power being transmitted from the wheel 23 to the pinion 22 and from thence through the sprocket wheels 20, belts 19 and sprocket wheels 18$^a$ as will be readily understood.

24 represents the digging scoops which are preferably secured to the cross bars 15$^c$ at the outer ends of the spokes of the cylinder 15, and the sides of these scoops converge as seen in Figs. 1 and 3. The scoops are made up of strips after the manner of a sieve to produce grated body portions and include side pieces 25$^a$ to which plow points 25 are secured. When the cylinder is revolved and the plow points are forced into the ground so that a certain amount of dirt is scooped up with the potatoes being dug, the dirt will be sifted through the scoops, leaving the screened bodies to be carried over the cylinder.

As the cylinder continues to revolve and the potatoes are conveyed to the top thereof, they will roll from the scoop which originally dug them onto the back of the scoop in advance thereof and thence onto the sizing screen 26. The mesh of this screen is such that it will size the potatoes, that is to say, smaller potatoes will pass through the mesh machine of the sizing screen, while larger ones will roll from off its surface.

In order that the sized potatoes may be properly gathered, I provide a small truck 27 mounted upon suitable wheels 28, and this truck is attached in any suitable manner to the machine as a trailer, the truck being divided into two compartments 28ᵃ and 29 so positioned relative to the sizing screen 26, that the smaller potatoes will fall into the compartment 28ᵃ, while the larger potatoes will roll into the compartment 29.

From the foregoing description, it will be seen that a potato digger built in accordance with my improvement when properly driven over rows of potatoes, will automatically dig said potatoes, sift the dirt therefrom and finally size and deliver these potatoes into their proper receptacles; and as such a machine is simple and cheap of construction and effective in operation, it will greatly facilitate the digging of potatoes upon a large scale.

Of course I do not wish to be limited to the exact details of construction as herein shown, as these may be varied within the limits of the appended claims without departing from the spirit of my invention.

Having thus fully described my invention, what I claim as new and useful is:

1. A potato digger comprising a frame, traction wheels supporting the rear of said frame, guide wheels supporting the front of said frame, a shaft adjustable substantially vertically in said frame, a cylinder revolubly mounted on the shaft and including hubs, spokes radiating therefrom, cross bars at the outer ends of the spokes and strips mounted in spaced relation on said bars, scoops mounted on the cross bars and projecting from the cylinder, and means to transmit motion from the traction wheels to the cylinder.

2. A potato digger comprising a wheeled frame having substantially verical slots therein, a shaft having its ends projecting into said slots whereby the elevation of said shaft may be regulated, means to hold said shaft in different adjusted positions, a screening cylinder revolubly mounted on said shaft, means to revolve said cylinder, and scoops on the periphery of said cylinder.

3. The structure set forth in claim 2 wherein the scoops include converging side members, grated body portions, and a plow point mounted on the contiguous ends of the side members of each scoop.

In testimony whereof, I have hereunto affixed my signature.

GEORGE BACKER.